A. MUENK.
MOTOR VEHICLE AXLE.
APPLICATION FILED JAN. 20, 1921.
1,396,869.
Patented Nov. 15, 1921.
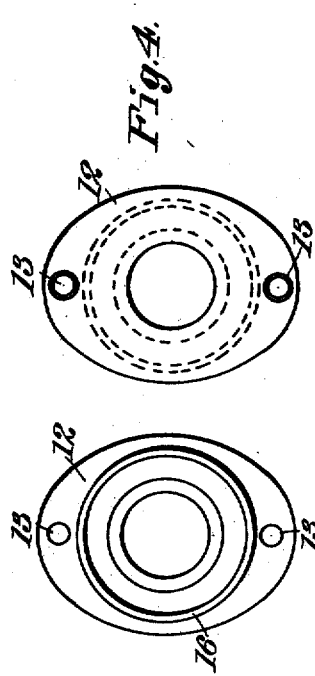
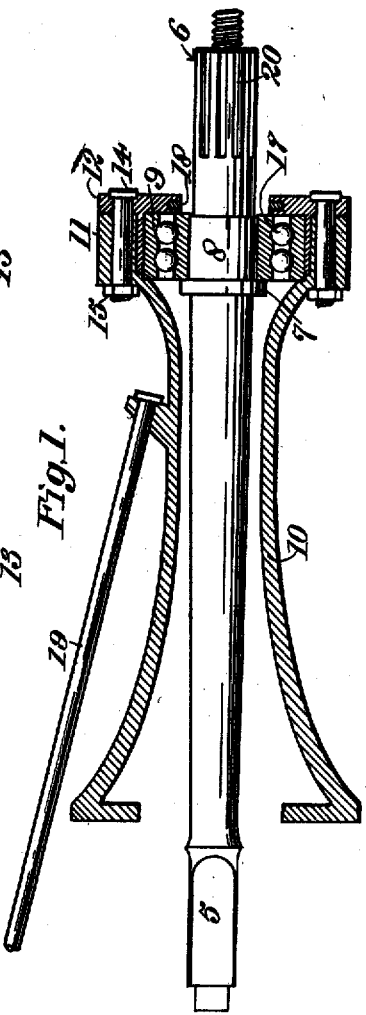
INVENTOR.
Arthur Muenk

UNITED STATES PATENT OFFICE.

ARTHUR MUENK, OF OAKLAND, CALIFORNIA.

MOTOR-VEHICLE AXLE.

1,396,869.        Specification of Letters Patent.        Patented Nov. 15, 1921.

Application filed January 20, 1921. Serial No. 438,739.

*To all whom it may concern:*

Be it known that I, ARTHUR MUENK, a citizen of the United States, and a resident of Oakland, in the county of Alameda and State of California, have invented a new and useful Motor-Vehicle Axle, of which the following is a specification.

My invention relates in general to axles for motor vehicles but has reference more particularly to a rear axle and mounting therefor which is especially applicable to withstand the hard usage in motor stages and other such vehicles which carry heavy loads.

In the accompanying drawing I have illustrated a preferred form of the invention, in which:—

Figure 1 is a longitudinal section through an axle housing with the axle supported therein; Fig. 2 is a side elevation of the axle; Fig. 3 is a view of the inside face of the anti-friction device retainer and Fig. 4 is a view of the outer face of the anti-friction device retainer.

Referring now to the drawing in detail one of the important features of the invention resides in the construction of the axle *per se* to render the same unusually rugged and capable of withstanding the jolts and jars occasioned by rough roads and heavy loads. The axle therefore tapers and increases in diameter from the differential engaging end (5) to the wheel mounting end (6).

It has been found in practice that rear axles often break off at the wheel mounting end, due to the small diameter of the same at this point. This disadvantage will be readily overcome by the form of axle suggested herein.

The axle should have a more or less conventional annular abutment (7) at the inner end of a shoulder portion (8), the length of the shoulder portion (8) being substantially that of the length of the ball bearing or other anti-friction device (9) and the ring (7) will act as an abutment for the anti-friction device. The housing (10) preferably terminates in the relatively large annular bearing (11) made to accommodate the anti-friction device (9) with the same confined by means of the plate (12) which has a pair of diametrically oppositely disposed openings (13) through which the bolts (14) pass, and with openings in the bearing (11) through which the bolts also pass with a nut (15) engaging the threaded end of the same. The diameter of the anti-friction device (9) is less than that of the diameter of the bearing (11), but the plate (12) has an annular extension (16) which is presented between the anti-friction device (9) and the inner circumference of the bearing (11), and with the ring overlapping the outer face of the ball bearing device and confining the same against the annular abutment (7).

The anti-friction device will preferably comprise a double row of ball bearings (17) properly confined in a race as is customary in devices of this kind. The inside edge of the plate (12) will be provided with a felted or a like wiper (18) to prevent a leakage of lubricant.

(19) represents the suspension rod to the housing (10) and (20) represents key or the like slots for keying the hub on the wheel to the axle.

I claim:

In combination, a driving axle for motor vehicles, and a housing for the axle including a confining mounting for an anti-friction device, the anti-friction device being mounted and confined within the outer end of the housing with the axle passing therethrough and with its extremity projecting beyond the end of the housing, and a detachable plate closing the end of the housing and adapted to confine the anti-friction device in the housing, said plate having an annular tongue member, said anti-friction device comprising ball bearings confined between inner and outer rings, the outer ring being of a less diameter than the end of the housing which receives it and the said annular tongue member presented between the said outer ring and the inner circumference of the housing to hold the outer ring against rotation.

ARTHUR MUENK.